Aug. 10, 1926.
M. H. POOLE
GATE
Filed Jan. 25, 1923   2 Sheets-Sheet 1
1,595,524
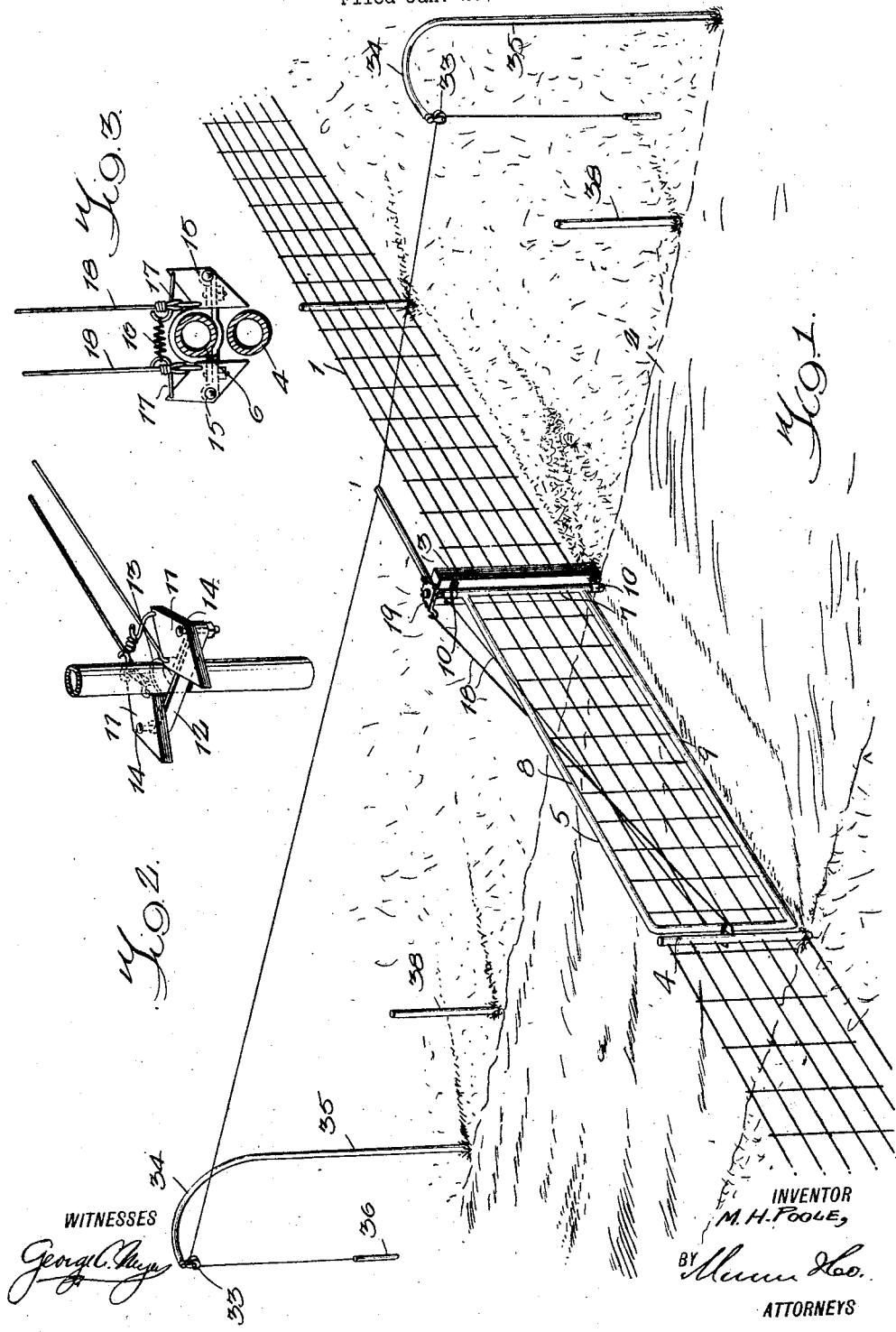
WITNESSES
George C. ...
INVENTOR
M. H. Poole,
BY Munn & Co.
ATTORNEYS

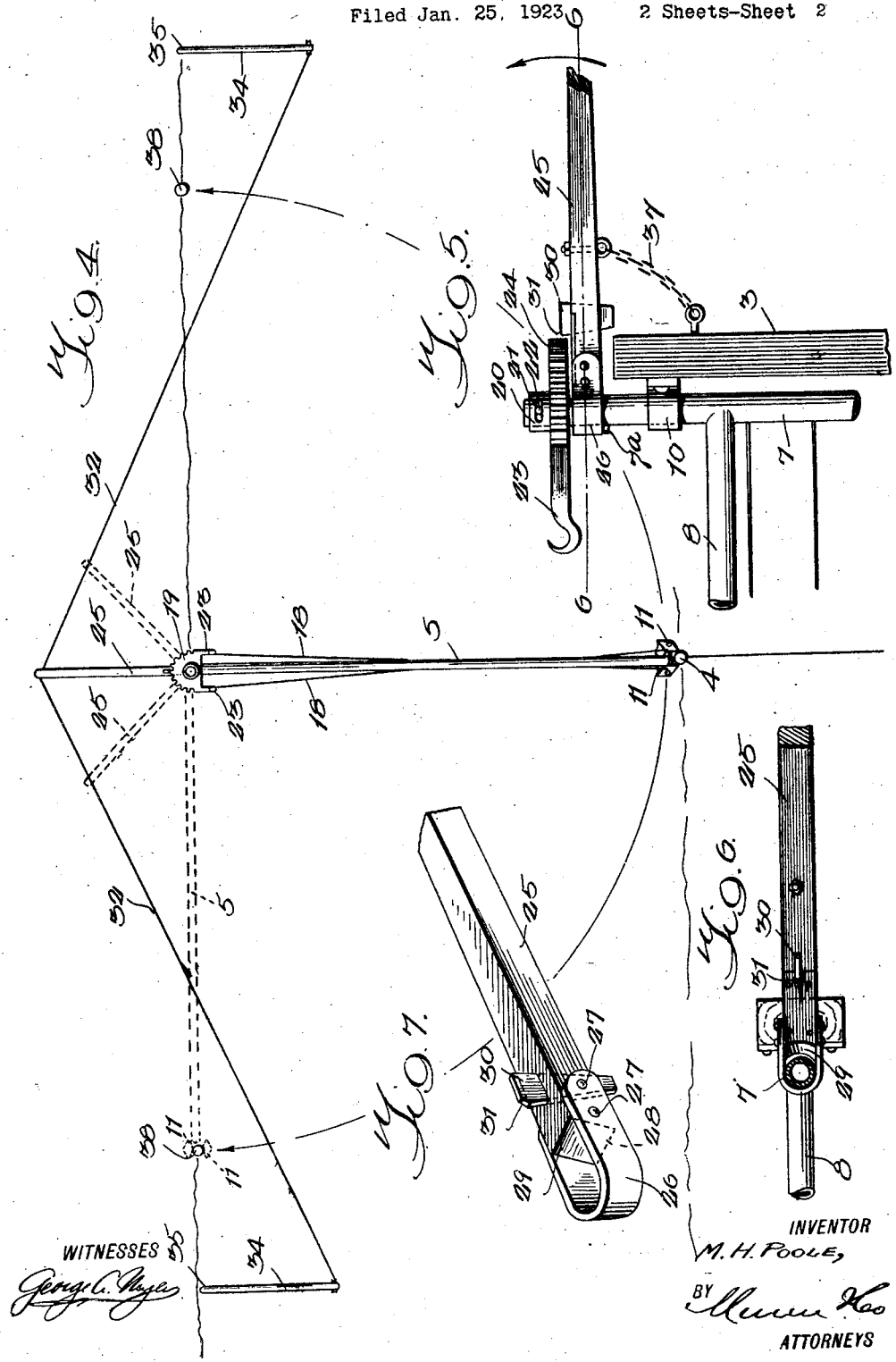

Patented Aug. 10, 1926.

1,595,524

UNITED STATES PATENT OFFICE.

MALCOLM H. POOLE, OF GREAT FALLS, MONTANA, ASSIGNOR TO ANNA C. POOLE, OF GREAT FALLS, MONTANA.

GATE.

Application filed January 25, 1923. Serial No. 614,860.

My invention relates generally to improvements in swinging gates, and more particularly to operating mechanisms for swinging gates, and it consists in the combinations, constructions and arrangements herein described and claimed.

An object of my invention is to provide an operating mechanism for swinging gates which embodies means operable to effect movement of a swinging gate from and to a position in which disposed in closing relation to a gate opening, to and from a laterally swung position at either side of the gate opening and for automatically engaging with fixed latch posts or members to releasably hold the gate in closed position or in laterally swung open position at either side of the gate opening.

A further object of my invention is to provide a gate operating mechanism of the character described, which is adapted to be operated by the operator of a vehicle passing through the gate opening, without there being any necessity of the operator dismounting from the vehicle or of stopping the vehicle during the operation of the gate.

A further object of my invention is to provide a gate operating mechanism of the character described, the operation of which will be unimpaired by any sagging or vertical displacement of the gate in respect to its support that is likely to take place in service.

A still further object of the invention is to provide an operating mechanism of the character described which can be operatively applied to any swinging gate of conventional construction and which is thoroughly practical commercially.

Other objects and advantages will be apparent from the following description considered in conjunction with the accompanying drawings in which:—

Figure 1 is a perspective view showing a swinging gate equipped with an embodiment of the invention;

Figure 2 is a relatively enlarged fragmentary perspective view, showing a vertical member of the gate frame and associated latch elements comprised in the mechanism;

Figure 3 is a plan view of the structure exhibited in Fig. 2, showing also a latch post in position to be engaged by the latch elements;

Figure 4 is a plan view of the gate and gate operating mechanism shown in Fig. 1, showing in full lines the position of the gate and the movable parts of the operating mechanism when the gate is in closed position, and showing in dotted lines the positions of the gate and a movable part of the operating mechanism when the gate has been swung laterally in one direction to open position;

Figure 5 is a relatively enlarged fragmentary elevation of a portion of the gate operating mechanism shown in Figs. 1 and 4;

Figure 6 is a section on the line 6—6 of Fig. 5, and;

Figure 7 is a relatively enlarged perspective view of the lever included in the structure shown in Figs. 5 and 6.

Referring now to the drawings, and particularly to Figure 1, I show a fence 1 provided with a gate-opening through which extends a roadway 2, the gate-opening being defined by spaced apart posts or uprights 3 and 4, respectively. The post 4 is shown as being tubular, while the post 3 is of greater area in cross section and supports a gate 5 which is shown as being of the "wire gate" type of construction. The gate 5 is of substantially rectangular form and includes a frame consisting of vertical end members 6 and 7, respectively, connected by spaced horizontal members 8 and 9, respectively, the vertical member 7 being extended above the upper horizontal member as shown and being swingingly supported upon the post 3 through the agency of straps 10 or the like.

The upright 4 constitutes a latch post which is adapted to be embraced by cooperative latch elements 11 which are pivotally supported upon a transverse bar 12 secured by a strap 13 to the vertical frame member 6 in a desirable position along the latter.

The latch elements 11—11 are similar in configuration and each is formed as a parallelogram. Vertical studs 14 carried by the latch elements 11—11 at the remote corners thereof are journaled in bearings 15 provided at the opposite ends of the supporting bar 12 so that corner portions of the latch elements extend beyond the vertical member 6 while the opposite corner portions of the latch elements extend rearwardly of the vertical member 6 and are connected by a spring 16 attached to the last named corners of the latch elements by means of hooks 17 or the like, whereby the rearward corner portions of the latch elements will be yieldingly held against movement apart.

The projecting corner portions of the latch elements 11—11 are adapted to embrace the fixed post 4 to releasably hold the gate against movement laterally of the gate opening. To release the gate from the latch post 4, my invention provides a pair of crossed latch plate operating cables 18 which are secured at their forward ends to the proximate corner portions of the latch elements 11—11 and extend rearwardly to a sector plate 19 which is pivotally supported upon the extended upper end of the rear vertical member of the gate frame in a manner which will be hereinafter described.

The sector plate 19 comprises a hub 20 receiving the extended upper end of the vertical frame member 7, and being provided with an arcuate slot 21 through which a radial pin or stud 22 carried by the frame member 7 extends so that the sector plate 19 has limited movement about the axis of the frame member 7 independently of the latter. The sector plate 19 has hooks 23 extending from opposite sides thereof toward the latch elements 11—11 and the crossed latch element operating cables 18—18 are attached to these hooks. The arcuate edge of the sector plate remote from the latch elements is provided with teeth 24. A sector plate operating lever 25 is supported at its one end upon the extended upper end of the frame member 7 through the agency of a strap 26 which loosely embraces the extended upper end portion of the frame member 7 and has its end portions secured to the lever 25 in straddling relation to the latter, as indicated at 27, so that the lower edge 28 of the beveled inner end 29 of the lever 25 will contact with the upper end portion of the frame member 7 and cooperate with the strap 26 to hold the latter and the adjacent end portion of the lever close to the underside of the sector plate 19 when the lever 25 is in its downwardly swung position while permitting slight swinging movement of the lever 25 upwardly about the connection at 27. The latter carries a fixed dog or projection 30 having a beveled corner portion 31 adapted to engage with the teeth 24 of the sector plate when the lever 25 has been swung upwardly to its highest position. However, when the lever 25 is in its downwardly swung position as illustrated in Figs 5 and 6, the dog or projection 30 will be out of engagement with the teeth of the sector plate. The strap 26 may be held against any appreciable downward movement on the frame member 7 when the lever 25 is in its upwardly swung position by a stud projection 7ª which is on the member 7 below the strap 26.

It will therefore be obvious that the lever 25 is capable of a relatively great swinging movement in a horizontal plane about the axis of the frame member 7 and is also capable of a limited up and down movement to cause the lever 25 to be connected with and disconnected from the sector plate 19. I therefore term the lever 25 a "floating lever."

The lever 25 may be operated by means of cables 32, which are attached thereto at its outer end and extend laterally in opposite directions through supporting sheaves 33—33 which are carried by laterally turned upper end portions 34—34 of standards or supports 35 located at equal distances from the post 3. The laterally turned end portions of the posts 35—35 overhang the roadway 2 at a height considerably greater than that of the frame member 7 and the bodies of the standards 35 are disposed so that a vertical plane extending therethrough will also intersect the upright frame member 7. The lever operating cables 32—32 are provided with weights 36 at their free ends, which therefore hang pendant over the roadway adjacent to one side of the latter and in position to be grasped by the driver or operator of a vehicle, passing along the roadway toward or from the gate opening.

From the foregoing description of the various parts of the device the operation thereof may be readily understood. The weights 36—36 substantially counterbalance each other and are insufficient to raise the lever 25 so that the projection or dog 30 carried thereby will engage with the teeth of the sector plate 19. In order to operate the lever 25, the operator of a vehicle or a pedestrian approaching the gate will grasp the weight 36 at the proximate side of the gate and will first raise the weight to permit the lever to swing in the direction away from him through an arc of approximately 45 degrees, as indicated by the one dotted line position in Fig. 4. The weight 36 is then pulled downwardly which will first cause the lever 25 to be raised until the dog or projection 30 engages with the sector plate 19 and will then cause rotation of the sector plate independently of the gate until the stud 21 engages with one end of the slot 22, when the gate and sector plate will swing as a unit laterally of the gate opening and away from the operator. It is to be understood that the movement of the sector plate independently of the gate is sufficient to swing one of the latch elements 11 about the axis of its pivot until the projecting corner portion thereof has been moved rearwardly into the plane of the vertical frame member 6 of the gate so that the gate may swing laterally of the fixed post or standard 4 when the rotation of the sector plate is continued. The swinging movement of the gate and sector plate as a unit will continue in response to the lateral and upward pull upon the lever 25 until the gate has been swung nearly to right angular relation to the plane of the gate opening. At this time, the slack in a release chain 37, which has one end secured to the post 3 and its other end attached to the lever 25 at a point approximately one-third of the distance from the fulcrumed end thereof to its other end, will be taken up and continuation of the pull on the lever at the outer end thereof will result in the inner end of the latter being swung downwardly until the projection or dog 30 disengages the teeth of the sector plate.

Coincidentally with the release of the lever 25 from the sector plate 19, the gate will move into alinement with one of a pair of latch posts 38, which are positioned at opposite sides of the frame member 7 in alinement with the latter and with the vertical portions of the standards 35. The release of the lever from the sector plate will allow the spring 16 to act to draw the inner corner portions of the latch elements 11—11 together and to thus cause the outer corner portions of the latch elements to embrace the adjacent latch post 38 and to thus releasably hold the gate in open position.

When the operator has passed through the gate opening to the weight 36 at the other side thereof, the latter will be found in elevated position because of the pull exerted on the lever 25 in the manner described. The weight 36 is then grasped and drawn downwardly to effect release of the gate from the one latch post 38 and to cause swinging movement of the gate from open position to closed position, as will be understood from the foregoing. The weights 36 are adapted to be grasped by hand so that they may be conveniently manipulated to operate the mechanism in the manner described.

It has been found in practice that it is not necessary that an operator of a vehicle travelling at a slow rate of speed dismount therefrom in order to operate the mechanism.

Moreover, the gate operating mechanism described does not in any way prevent the operation of the gate in an ordinary manner since the sector plate 19 is normally disengaged by the dog or projection on the lever 25 and the latch elements 11 may be operated by hand, as by means of a pull on one of the latch plate operating cables 18.

It will be observed that all elements of the gate operating mechanism with the exception of the release chain 37 are supported upon the frame of the gate, and that therefore such sagging or vertical displacement of the gate as is likely to occur in service will not detrimentally affect the operation of the mechanism.

Obviously my invention is susceptible of embodiment in forms other than that which is illustrated in the accompanying drawings, and I therefore consider as my own all modifications and adaptations thereof which fairly fall within the scope of the appended claims.

I claim:

1. The combination with a gate controlling an opening and having spaced vertical end members, one of which is swingingly supported upon an upright support at one side of the opening for swinging movement about a vertical axis, of a gate operating mechanism comprising a pair of pivoted latch elements carried by the vertical member at the free end of the gate, said latch elements being adapted to cooperate with a fixed latch post located adjacent to the vertical member at the free end of the gate when the latter is in position to close said opening, spring means urging the latch elements toward position to engage said latch post, a sector plate supported upon the vertical member of the gate at the attached end of the latter and being capable of limited movement about the axis of said vertical member of the gate, a pair of crossed flexible elements connecting said sector plate and said latch elements and being arranged for actuation upon rotation of the sector plate to swing one of the latch elements out of position to engage said latch post, a lever mounted at one end for rotation about the axis of the vertical member at the attached end of the gate and being capable of limited rocking movement in a vertical plane, a projection upon said lever in position to engage teeth in the sector plate when the free end of the lever is rocked upwardly and to disengage the teeth in the sector plate upon a downward movement of the lever, and means extending laterally of the gate control opening and being connected with the lever at the free end of the latter for causing an upward and lateral pull on the latter to cause the lever to be locked to the sector plate and to operate the latter.

2. The combination with a gate controlling an opening and having spaced vertical end members, one of which is swingingly supported upon an upright support at one side of the opening for swinging movement about a vertical axis, of a gate operating mechanism comprising a pair of pivoted latch elements carried by the vertical member at the free end of the gate, said latch elements being adapted to cooperate with a fixed latch post located adjacent to the vertical member at the free end of the gate when the latter is in position to close said opening, spring means urging the latch elements toward position to engage said latch post, a sector plate supported upon the vertical member of the gate at the attached end of the latter and being capable of limited movement about the axis of said vertical member of the gate, a pair of crossed flexible elements connecting said sector plate and said latch elements and being arranged for actuation upon rotation of the sector plate to swing one of the latch elements out of position to engage said latch post, a lever mounted at one end for rotation about the axis of the vertical member at the attached end of the gate and being capable of limited rocking movement in a vertical plane, a projection upon said lever in position to engage teeth in the sector plate when the free end of the lever is rocked upwardly and to disengage the teeth in the sector plate upon a downward movement of the lever, pull cables attached to the lever at its free end and extending laterally thereof in opposite directions, guide sheaves supported at opposite sides of the gate opening above the level of said lever and through which the pull cables extend, weights carried at the free ends of said pull cables, latch posts located at opposite sides of the plane of the gate controlled opening and in a plane extending at right angles to the plane of the gate controlled opening and through the vertical member at the attached end of the gate said last named latch posts being adapted to be engaged by said latch elements when said gate is in laterally swung positions, and a release chain connected to the lever at a point nearer to its supported end than to its free end and being fixed at its other end for causing said lever to disengage said sector plate when the gate head has been swung laterally toward either of said last named latch posts.

3. The combination with a gate having a vertical end member supported to swing about its axis, of a gate operating mechanism comprising a sector plate supported upon said vertical member of the gate and being capable of limited movement about the axis of said vertical member, a lever mounted at one end for rotation about the axis of the vertical member of the gate and being capable of limited rocking movement in a vertical plane, a projection upon said lever in position to engage teeth in the sector plate when the free end of the lever is rocked upwardly and to disengage the teeth in the sector plate upon a downward movement of the lever, and means extending laterally of the gate and being connected with the lever at the free end of the latter for causing an upward and lateral pull on the lever to cause the lever to be locked to the sector plate and to operate the latter.

MALCOLM H. POOLE.